(No Model.) 2 Sheets—Sheet 1.

O. K. KAASA.
HAY RAKE AND LOADER.

No. 398,160. Patented Feb. 19, 1889.

WITNESSES
G. S. Elliott
E. W. Johnson

Ole Kittilsen Kaasa.
INVENTOR.
Attorney.

(No Model.) 2 Sheets—Sheet 2.

O. K. KAASA.
HAY RAKE AND LOADER.

No. 398,160. Patented Feb. 19, 1889.

WITNESSES.
G. S. Elliott
E. W. Johnson

Ole Kittilsen Kaasa,
INVENTOR,
by
Attorney.

UNITED STATES PATENT OFFICE.

OLE KITTILSEN KAASA, OF OSLO, MINNESOTA.

HAY RAKE AND LOADER.

SPECIFICATION forming part of Letters Patent No. 398,160, dated February 19, 1889.

Application filed May 3, 1888. Serial No. 272,641. (No model.)

*To all whom it may concern:*

Be it known that I, OLE KITTILSEN KAASA, a citizen of the United States of America, residing at Oslo, in the county of Dodge and State of Minnesota, have invented certain new and useful Improvements in Hay Rakes and Loaders; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in hay rakes and loaders; and it consists in the construction and combination of the parts, which will be hereinafter fully set forth, and specifically pointed out in the claims.

Figure 1:
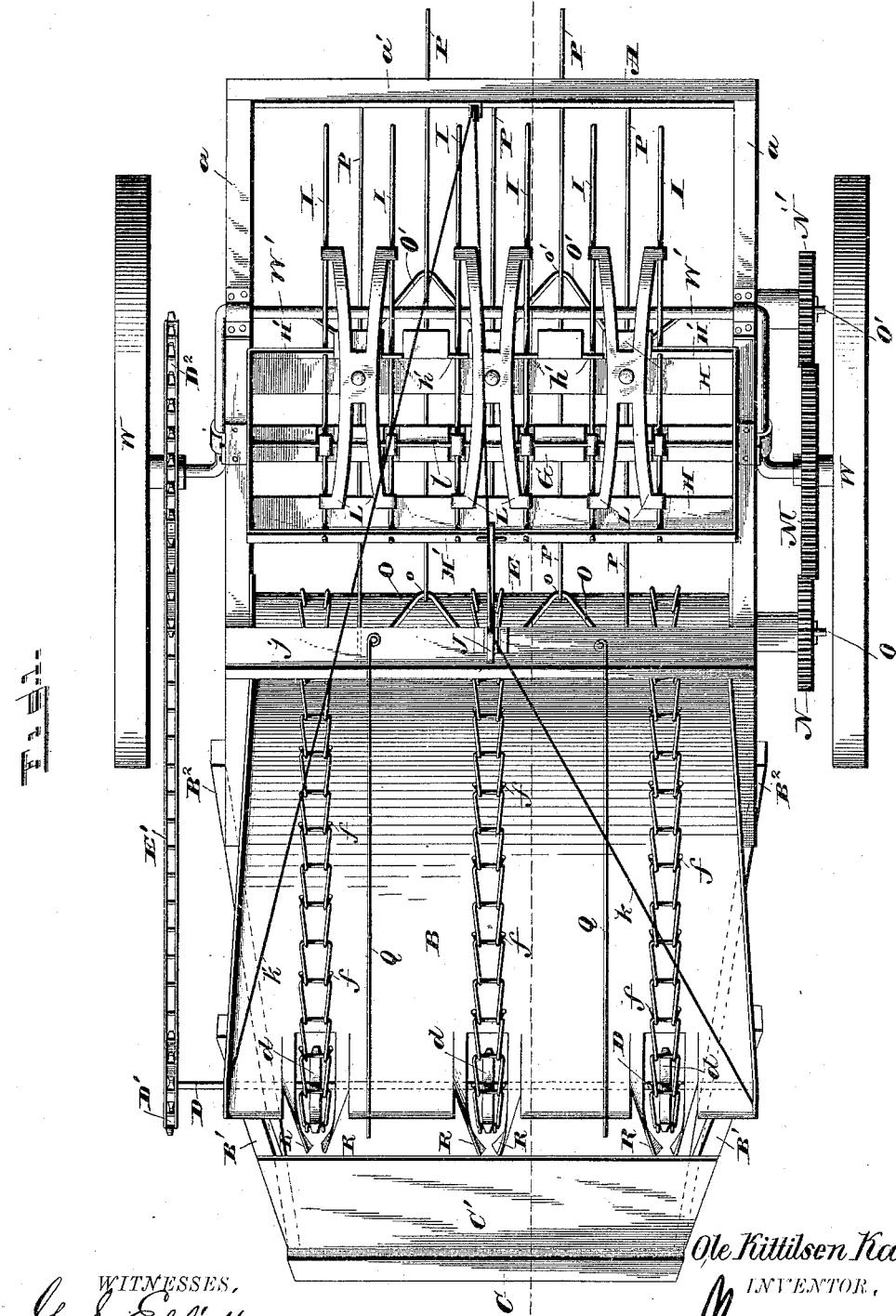
Figure 2:
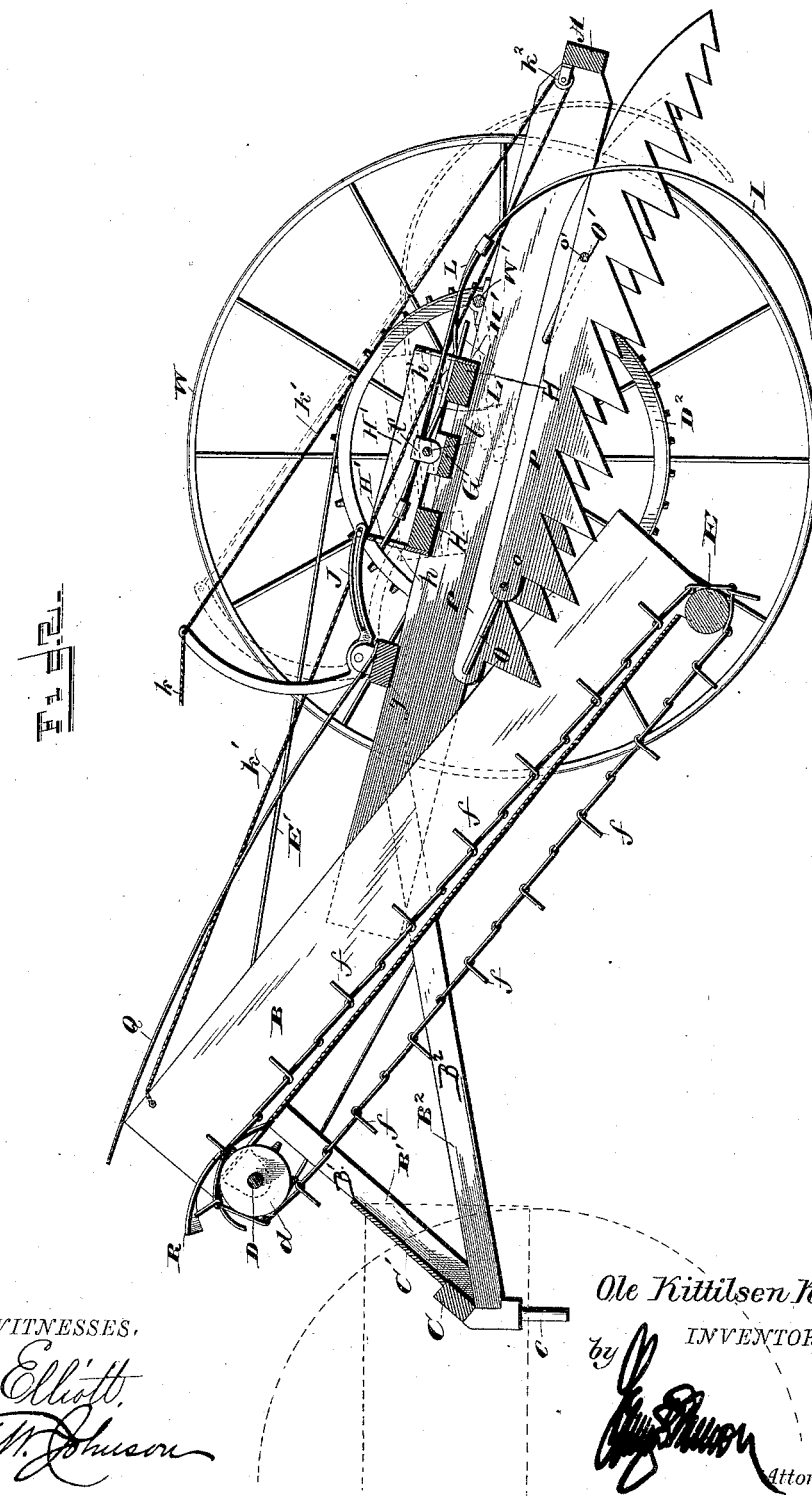

In the accompanying drawings, Figure 1 is a plan view of a hay rake and loader constructed in accordance with my invention. Fig. 2 is a longitudinal sectional view.

A refers to the main frame, which is slightly inclined to the rear and rigidly connected at its front to the sides of an inclined elevator-platform, B, upon which the hay or straw is elevated and deposited into a wagon or other vehicle.

The platform B and main frame A are provided at their front ends with bars B' B², said bars extending forward and downward and converging slightly, their lower ends being secured to a cross-bar, C, which is provided centrally with a depending pin, c, designed to enter an eye or loop secured to or formed in a vehicle-body to connect the rake and loader thereto. To the forward bars, B', is secured a plate or apron, C', to direct hay into the box or body of the vehicle and prevent its falling rearward beneath the inclined platform B, which carries the endless belts.

The inclined platform having raised sides is preferably constructed of sheet metal, or it may be made of wood secured to a suitable frame; and this platform B is provided at its upper and lower ends with bearings for the transverse shafts D and E, the shaft D being provided at suitable intervals with sprocket-wheels $d$, over which the endless elevator, chains pass, these chains being operated by an endless sprocket-chain, E', which passes over the sprocket-wheel D' and also over a sprocket-wheel, D², secured to the hub of one of the ground or supporting wheels.

The shaft or roller E may be plain, and the endless chains or belts which elevate the hay upon the platform B are provided with teeth $f$, formed by turning the ends of the links of the chain at right angles with the body of the chain.

The frame A is of rectangular form, the side rails, $a$, being connected by rear and front cross-rails, $a'\, j$, and centrally by a stout beam, G, above which is pivoted a rocking frame consisting of the sill-beams H, to which is secured a, preferably metal, box-like body, H', the vertical front and rear sides of which are provided with slots $h\, h'$ for the reception of the rake-teeth I. These teeth are carried in pairs by H-shaped spring-spiders L, secured at their centers by bolts, nails, screws, or other usual and well-known mechanical means to the rear sill-beam H of the rocking frame, each rake-tooth being secured to the front and rear ends of one of the arms of a spider, thus providing for the independent movement within limits of each tooth. Each rake-tooth is also provided at a proper point with a clip, $l'$, having perforated ends, through which passes a pivot-rod, $l$, positioned above and having its ends secured to the cross-beam G of the main frame. Owing to this arrangement the rod $l$ becomes the fulcrum of the rocking frame, as the spiders are secured to said frame, the teeth to the spiders, and the teeth pivoted on said rod, as shown.

The rocking frame is connected at its forward end to an elbow-lever, J, fulcrumed at its bend to the cross-rail $j$ of the main frame. The short arm of this lever projects rearward and engages an eye or slot, $h^3$, in the front wall, H', of the rocking frame, in order that said frame may be rocked to raise or depress the rake-teeth by moving the long or vertical arm of the lever in the proper direction. The rearward movement of the long arm of the lever is limited by a cord, $k$, connected at its ends to said end of the lever and to the side of the elevator-frame B and in the opposite direction by a cord, $k'$, passing from the long arm of the lever to and around a pulley, $k^2$, secured to the rear cross-rail, $a'$, of the main frame, and thence forward to the elevator-frame, to the side of which its end is secured. Owing to this arrangement an attendant positioned at the front of the elevator-frame is enabled by proper manipulations of the cord $k'$ to raise the rake-teeth from the ground, the lever moving automatically in the opposite direction upon releasing the cord, owing to the fact that the rocking frame is weighted at rear by the spiders and rake-teeth.

To avoid interference with the mechanism suspended within the main frame, I prefer to mount the ground or supporting wheels W upon the outwardly-projecting ends of a cranked axle, $W'$, the center of which extends across the top of the main frame to rear of the rocking frame, while its crank ends are properly secured to the side pieces of said main frame, as shown.

To the hub of one of the supporting-wheels W is secured a sprocket-wheel, $D^2$, as hereinbefore stated, actuating the chain $E'$, which drives the elevator-chains, while to the hub of the other supporting-wheel W is secured a gear-wheel, M, which meshes with and drives two gear-wheels, N and $N'$, fixed to the ends of transverse shafts O and $O'$, which are mounted in bearings secured to the main frame A forward and to rear of the rocking frame H. These shafts O and $O'$ have multiple cranks $o$ and $o'$, carrying long rake-blades P, arranged to alternate with and project rearward beyond the rake-teeth I, the upper edge of said blades being rounded at the rear to avoid contact with the rear cross-rail, $a'$, of the main frame, and their lower edges being provided with forwardly-inclined notches. Thus arranged, the blades P serve as clearers for the rake-teeth when the latter are raised, the forwardly-inclined notches being designed to carry or impel the hay accumulated by the rake forward and upward and deliver it to or deposit it on the elevator-platform B, where it is engaged and carried forward and upward by the endless elevator-chains heretofore referred to.

In operation hay will be gathered by the rake-teeth I as the machine travels forward and carried by the notched rake-blades forward to the elevator-chains in a manner well understood.

In order to prevent a dislodgment and scattering of the loose hay during its passage up the elevator, I secure to the cross-rail $j$ of the main frame a series of spring fingers or rods, Q, the free ends of which extend forward over the elevator platform and chains. I also provide the upper end of the platform adjacent to the elevator-chains with forwardly-projecting clearing-fingers R,'arranged in pairs and designed to clear the hay from the teeth $f$ of the elevator chains or belts, and also from the teeth of sprocket-wheels $d$.

Having thus described my invention, I claim—

1. In a hay rake and loader, the combination, substantially as described, of the main frame having a transverse pivot-rod, the rectangular rocking frame having its end sills pivoted on said rod, spiders secured to the rear sill of the rocking frame and having spring-arms extending in front and rear thereof, rake-teeth fulcrumed on the pivot-rod and each connected to the front and rear ends of one of the spring-arms of a spider, a lever fulcrumed on the main frame and connected at one end to the rocking frame, and flexible connections secured to the other end of the lever to control its position.

2. In a hay rake and loader, the combination, substantially as described, of the main frame, the elevator-frame and endless elevator, the supporting-wheels, to the hub of one of which is secured a gear-wheel, multiple crank-shafts O and $O'$, journaled on the main frame at opposite sides of the carrying-wheel axles, and each provided with a pinion meshing with the gear-wheel on the wheel-hub, rake-teeth carried by a rocking frame pivoted to the main frame, means for tilting the rocking frame to raise the rear ends of the rake-teeth, and rake-blades carried by the cranks of shafts O $O'$ and extending between and to the rear of the rake-teeth, whereby the rake-blades serve as clearers for the rake-teeth when the latter are raised.

3. In a hay rake and loader, the combination, substantially as described, of the main frame, the inclined elevator-frame and its endless elevator, a rocking frame pivoted to the main frame and carrying rake-teeth, an elbow-lever fulcrumed at its end on the main frame and having an arm connected to the front of the rocking frame, a flexible connection, $k$, secured at one end to the vertical arm of the lever and at its other end to the front of the elevator-frame, and a flexible connection, $k'$, also secured to said arm of the lever and passing thence over a pulley in rear of said lever and thence forward and secured to the front of the elevator-frame.

In testimony whereof I affix my signature in presence of two witnesses.

OLE KITTIl SEN KAASA.

Witnesses:
AUG. E. ANDERSON,
EDWIN J. ROME.